United States Patent Office

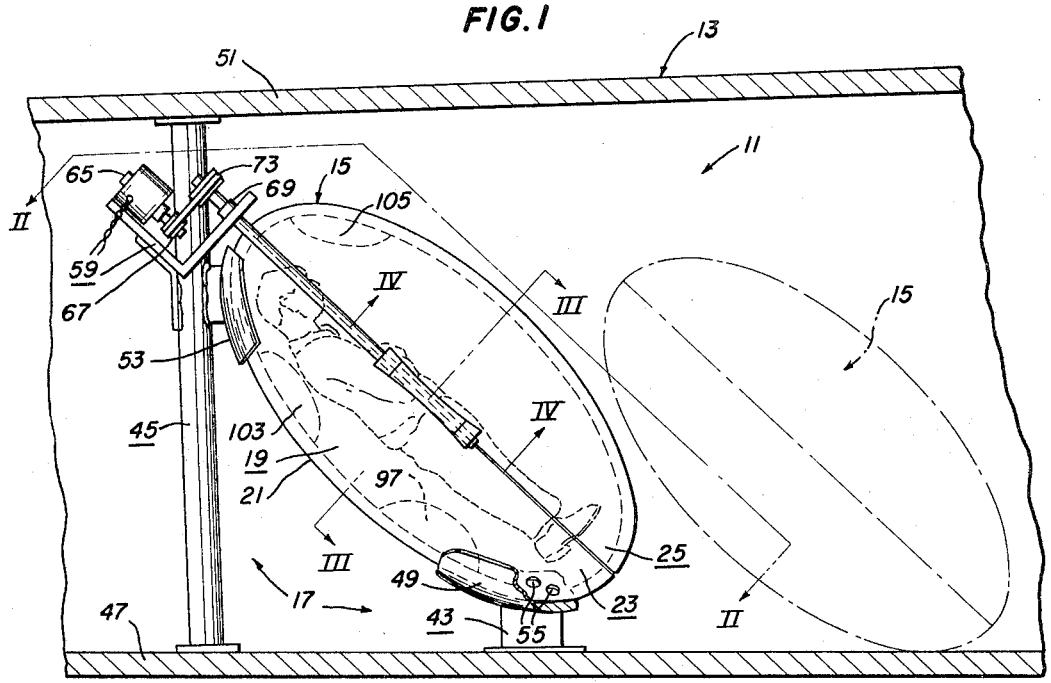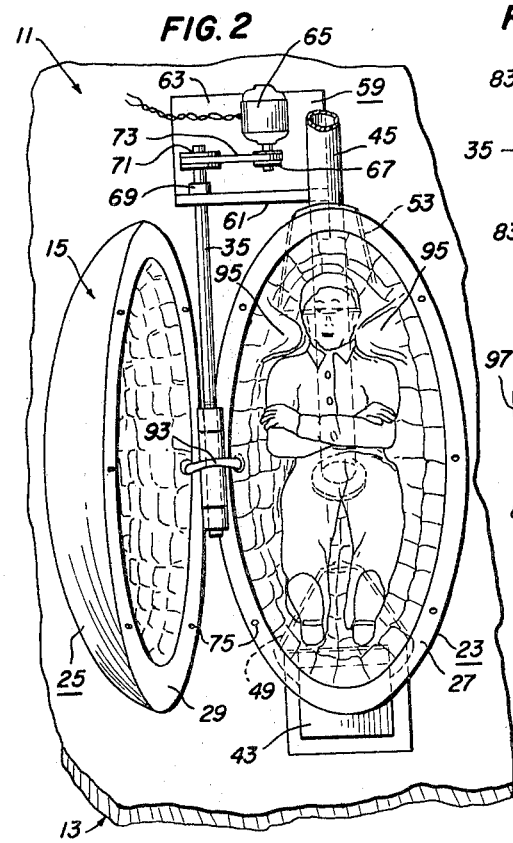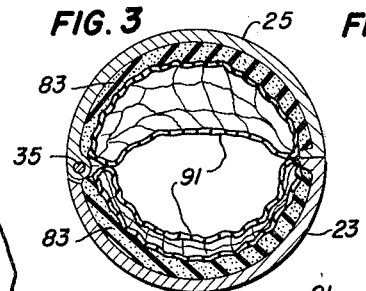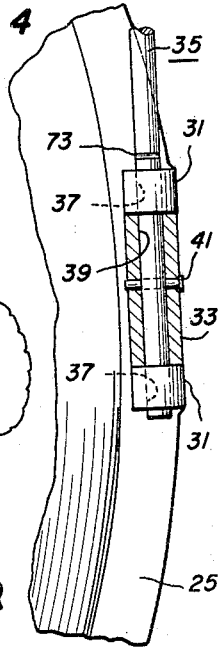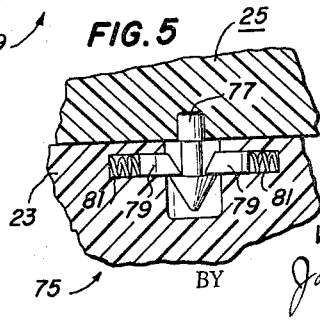

3,294,346
Patented Dec. 27, 1966

3,294,346
SAFETY MEANS FOR PROTECTING A RIDER
IN AN AIRCRAFT CRASH
Willard Summers, 3007 Allshore, Memphis, Tenn. 38118
Filed Jan. 27, 1965, Ser. No. 428,345
9 Claims. (Cl. 244—121)

This invention relates generally to aeronautical safety devices and relates particularly to a means for protecting a rider from injury in the event of an aircraft crash.

Various devices have been devised to reduce the hazard of injury to an aircraft passenger or rider in the crash of an aircraft. A considerable number of safety devices have been directed toward parachutes or other escape-by-air devices allowing the rider to leave the aircraft before the crash occurs. Aircraft today, however, fly so fast that there is little time for a rider to leave a plane or prepare for an impending crash. Aside from seat belts, or other such nominal safety devices, a rider has small protection in an aircraft crash.

The general object of the present invention is to provide a practical means whereby a rider of an aircraft may come through a crash safely, and such means which includes an oblong rider-enclosing capsule adapted to break away from its mounting upon impact of the aircraft in a crash.

A further object is to provide aircraft safety means which does not require skill or practice to employ.

A further object is to provide aircraft safety means which may be quickly made ready in the event of an impending crash.

A further object is to provide a substantially simple and economically constructable aircraft rider safety means.

A further object is to provide aircraft rider safety means suitable for protecting a rider from injury of an airplane crash in water.

A further object is to provide aircraft rider safety means suitable for protecting a rider from injury or exposure of an airplane crash in snow, or cold and freezing temperature.

A further object is to provide an aircraft safety means having a radio device for transmitting a signal of distress whereby searchers may readily find a rider.

A further object is to provide pneumatic shock absorbing means in the rider-enclosing capsule for insulating the rider from shock upon impact of the aircraft.

A further object is generally to improve the design and construction of aircraft rider protecting means.

The means by which the foregoing and other objects of the present invention are accomplished and the manner of their accomplishment will be readily understood from the following specification upon reference to the accompanying drawings, in which:

FIG. 1 is a side elevational view of the structure of the present invention as viewed along a longitudinally and vertically extending section of the aircraft, and with a portion of the structure being broken away for purposes of illustration.

FIG. 2 is a horizontally oblique view of the aircraft safety structure taken as on the line II—II of FIG. 1, and with the capsule structure being in an open disposition.

FIG. 3 is a transverse sectional view of the capsule taken as on the line III—III of FIG. 1.

FIG. 4 is an enlarged longitudinal sectionalized view of the hinge means of the capsule taken as on the line IV—IV of FIG. 1.

FIG. 5 is an enlarged view of the latch means of the capsule structure.

FIG. 6 is a schematic showing of the pneumatic shock absorbing means of the capsule structure.

Referring now to the drawings in which the various parts are indicated by numerals, the aircraft safety structure of the present invention is indicated generally by the numeral 11, and the aircraft frame or fuselage is indicated by the numeral 13.

Structure 11 includes, basically, a hollow elongated capsule 15 and mounting means 17 mounting capsule 15 to frame 13 of the aircraft. Capsule 15 is adapted to completely enclose a rider, as shown in FIG. 1, and includes an outer covering or shell 19 of steel or plastic material. Shell 19 preferably is formed of walls of uniform thickness and is substantially the shape of a prolate ellipsoid. The outer surface 21 of shell 19 is substantially smooth and hard and without any projections. Shell 19 preferably is divided into two parts including a first or base part 23 and a second or closure part 25. Mating elliptical surfaces 27, 29 respectively of base part 23 and closure part 25 provide a water and air-tight seal between the shell parts.

Shell parts 23, 25 are hinged together along one side of shell 19 in the following manner: A pair of symmetrically arranged tubular hinge eyes 31 are integrally secured to edge surface 27 of shell part 23. A single tubular hinge eye 33 is integrally secured to closure part 25 and is fitted between hinge eyes 31. A hinge shaft 35 is fitted in apertures 37, 39 respectively of eyes 31, 33. Shaft 35 is fitted to turn freely in aperture 37 of base part hinge eyes 31 and is fixedly secured to tubular hinge eye 33 of closure part 25 by a lock pin 41. Thus, turnably manipulating hinge shaft 35 hingedly moves closure part 25 and opens or closes capsule 15.

Mounting means 17 detachably secures capsule 15 to the aircraft fuselage or frame 13. The mounting means is of the frangible or break-away type and is adapted to release capsule 15 upon impact or crash of the aircraft (illustrated in broken lines in FIG. 1). A forward support 43 and a rearward support 45 mount the capsule in a horizontally oblique attitude; the major axis of capsule 15 preferably is at a 35 to 45 degree angle relative to horizontal. Forward support 43 is securely attached to aircraft fuselage bottom 47 and is provided at the upper portion thereof with the convex-concave surfaced support plate 49. Rearward support 45 is secured to and extends between fuselage top 51 and fuselage bottom 47. A convex-concave surfaced support plate 53 is secured on the forward side of rearward support 45. The concave surfaces of support plates 49, 53 engage respectively lower and upper outer surface portions of shell base part 23. Suitable frangible bonds, such as cement 55, adhesively secure shell base part 23 to support plates 49, 53. Bonds 55 are adapted to become severed on impact of the aircraft, providing break-away mounting means for detachably securing capsule 15 to the aircraft fuselage. If desired, bonds 55 may be in any other suitable form, such as shear pins or other frangible devices, without departing from the spirit and scope of the present invention.

Means for turnably manipulating closure shell part 25 and for opening and closing capsule 15 is provided and preferably is as follows: a right-angular support member 59 is fixedly secured to and extends laterally from rearward support 45. Support member 59 includes a forward plate 61 and a rearward plate 63. A bidirectional motor 65 is mounted on rearward plate 63 and is provided with a drive pulley 67. Hinge shaft 35 extends through a bearing 69 and is provided at the upper end thereof with a pulley 71. Pulleys 67, 71 are connected by a belt 73. Switch means, not shown, is provided in the electrical circuit driving motor 65, for controlling the opening and closing of capsule 15. It is contemplated that the switch means may be automatically actuated on impact of the airrraft or may be manually actuated by the rider in the capsule. Hinge shaft 35 is provided with a circumferential groove 73, as best seen in FIG. 4. Groove 73 is disposed slightly above the upper one of tubular hinge eyes 31 of shell base part 23. Groove 73 provides a weakened or frangible portion of shaft 35, and which portion is adapted to break upon impact of the aircraft and to allow the capsule to be free from the capsule closing motor means.

Latch means is provided for holding shell parts 23, 25 together and capsule 15 in a closed disposition. The latch means preferably includes a plurality of latch assemblies 75 spaced at intervals around the respective elliptical surfaces 27, 29 of shell parts 23, 25, as best seen in FIG. 2. Each of latch assemblies 75 includes a cone-headed pin 77 perpendicularly secured in the elliptical edge of closure part 25 and a pair of oppositely disposed bevel-faced bolt members 79 secured in the elliptical edge of base part 23. Bolt members 79 are slidably fitted in socket openings and are urged convergingly inward respectively by a pair of coiled compression springs 81.

Shock absorbing means are provided for minimizing the concussive forces on the rider in the capsule. The shock absorbing means preferably includes both resilient material padding means 83 and pneumatic envelope means 89, as best seen in FIGS. 3 and 6. Padding 83 is of sponge rubber or of a comparatively resilient synthetic material, and is secured along the inside surfaces respectively of the base and closure parts 23, 25. The pneumatic shock absorbing means of the capsule preferably includes a pair of flexible envelopes 91 secured respectively over padding 83 of base and closure parts 23, 25 of the capsule. Envelopes 91 are secured respectively at the peripheral edges thereof adjacent the mating elliptical surfaces 27, 29 of shell parts 23, 25.

A short conduit 93 connects envelopes 91, as best seen in FIGS. 2 and 6. The envelope of shell part 23 is provided with a pair of shoulder supports 95 projecting inwardly for bracing the shoulders of the rider. A compressed air container 97 is secured along the inside surface of base shell part 23. Container 97 preferably is contoured to fit the inside surface of shell part 23 and without sharp edges or protuberances. Conduit means 99 is provided between container 97 and envelopes 91, and valve means 101 is fitted in conduit means 99 for controlling the passage of air into envelopes 91. Valve means 101 may be actuated by the rider or by an automatic actuating mechanism and inflates the envelopes upon impact of the aircraft. A container of oxygen 103 is provided in the interior of capsule 15 and is secured along the inside surface of base part 23 of the capsule. Oxygen dispensing means, not shown, is provided for dispensing the oxygen to the rider. A ratio transmitter 105, of known construction, is secured along the inside surface of shell closure part 25. Transmitter 105 provides means for transmitting electrical impulses or a distress signal for aiding in the search of a missing capsule.

The use and function of aircraft safety structure 11 is as follows: Prior to an impending crash or collision of an aircraft, the shell part 25 is closed by the actuation of motor 65 and the rider enclosed in capsule 15. Valve means 101 is opened and envelopes 91 inflated and pressed around the rider. The oxygen supply container 103 is turned on and transmitter 105 is made operative. On impact or collision of the aircraft, capsule 15 breaks free from its mounting and continues in a forward path, as shown in broken lines in FIG. 1. It is contemplated that the smooth, hard outer surface and ellipsoidal shape of the capsule will enable it to glance or ricochet from obstructions it may encounter. It is further contemplated that, should the capsule fall in water, it would float and would be balanced in such a manner as to float with the rider in an upright position.

The safety means of the present invention is easily employed and does not require skill or practice to use. It may be quickly made ready in the event of an impending crash. It is considered that the smooth, hard, contoured shell of the capsule, the shock absorbing means in the interior thereof, and the break-away mounting feature of the capsule will minimize the hazard to a rider in an aircraft crash. Further, because of the elliptical design of the capsule, never will a maximum amount of pressure be exerted at any one time at any given point on the capsule. Thus, any contact with another object will result in a glancing effect, so that, for example, the capsule, due to its shape and the toughest feasible material for its outer surface, will go careening down a mountain side, glancing over boulders and rocks, and off of trees, to bring the passenger to a safe stop.

Although the present invention has been described and illustrated with respect to a preferred embodiment thereof, it is to be understood that it is not to be so limited since changes and modifications may be made therein which are within the full intended scope of this invention as hereinafter claimed.

I claim:

1. In an aircraft having a frame structure, safety means for protecting a rider from injury in the event of a crash of the aircraft, said safety means comprising a hollow shell completely enclosing space within the interior of said shell and adapted to enclose a rider within said interior; said shell being elongated and having a substantially smooth, hard and continuous outer surface; ingress and egress means for the rider to enter or leave the interior of said shell, and frangible break-away mounting means for detachably securing said shell to said frame structure of said aircraft and for providing detachability of said shell responsive to the momentum of said shell upon crashing of said aircraft.

2. In an aircraft having a frame structure, safety means for protecting a rider from injury in the event of a crash of the aircraft, said safety means comprising a hollow shell completely enclosing space within the interior of said shell and adapted to enclose the rider within said interior; said shell being substantially in the shape of a prolate ellipsoid and having a substantially smooth, hard, continuous outer surface; ingress and egress means for the rider to enter or leave the interior of said shell, and frangible break-away mounting means for detachably securing said shell to said frame structure of said aircraft and for providing detachability of said shell responsive to the momentum of said shell upon crashing of said aircraft.

3. In an aircraft having a frame structure, safety means for protecting a rider from injury in the event of a crash of the aircraft, said safety means comprising a hollow shell completely enclosing space within the interior of said shell and adapted to enclose a rider within said interior; the outer surface of said shell being substantially smooth, hard and continuous and in the shape of a prolate ellipsoid; said shell including a first shell part and a second shell part and hinge means or hingedly joining said first and second shell parts, and frangible break-away mounting means for securing said shell to said frame structure of said aircraft with said mounting means including means interposedly attaching said first shell part and said frame structure of said aircraft and for providing detachability of said shell responsive to the momentum of said shell upon crashing of said aircraft.

4. In an aircraft having a frame structure, safety means for protecting a rider from injury in the event of a crash of the aircraft, said safety means comprising a hollow shell completely enclosing space within the interior of said shell and adapted to enclose a rider within said interior; the outer surface of said shell being substantially smooth, hard and continuous and in the shape of a prolate ellipsoid; said shell including a first shell part, a second shell part, and hinge means for hingedly joining said first and second shell parts; break-away mounting means for securing said shell to said frame structure with said mounting means including frangible means interposedly attaching said first shell part and said frame structure of said aircraft, and shock absorbing means in the interior of said shell for insulating the rider from said shell.

5. The safety means of claim 4 in which said shock absorbing means includes resilient padding secured along the inside surface of said first and said second shell parts.

6. The safety means of claim 4 which includes a container of compressed oxygen in the interior of said shell for the use of the rider.

7. The safety means of claim 4 which includes a radio transmitter in said shell for transmitting electrical signal impulses.

8. In an aircraft having a frame structure, safety means for protecting a rider from injury in the event of a crash of the aircraft, said safety means comprising a hollow shell completely enclosing space within the interior of said shell and adapted to enclose a rider within said interior; the outer surface of said shell being substantially smooth, hard and continuous and in the shape of a prolate ellipsoid; said shell including a first shell part, a second shell part, and hinge means for hingedly joining said first and second shell parts; break-away mounting means for securing said shell to said frame structure with said mounting means including frangible means interposedly attaching said first shell part and said frame structure of said aircraft, and shock absorbing means in the interior of said shell for insulating the rider from said shell, said shock absorbing means including flexible envelope means secured to the inside surface of said first shell part and said second shell part, a container of compressed air, conduit means between said container and said envelope means, and valve means fitted in said conduit means for controlling the passage of air into said envelope means.

9. In an aircraft having a frame structure, safety means for protecting a rider from injury in the event of a crash of the aircraft, said safety means comprising a hollow shell completely enclosing space within the interior of said shell and adapted to enclose a rider within said interior; the outer surface of said shell being substantially smooth, hard and continuous and in the shape of a prolate ellipsoid; said shell including a first shell part, second shell part, and hinge means for hingedly joining said first and second shell parts; break-away mounting means for securing said shell to said frame structure with said mounting means including frangible means interposedly attaching said first shell part and said frame structure of said aircraft, and shock absorbing means in the interior of said shell for insulating the rider from said shell, said shock absorbing means including resilient padding secured along the inside surface of said first and said second shell parts, flexible envelope means along the interior of said first shell part and said second shell part and disposed respectively over said resilient padding of said first and said second shell parts, a container of compressed air, conduit means between said container and said envelope means, and valve means fitted in said conduit means for controlling the passage of air into said envelope means.

References Cited by the Examiner

UNITED STATES PATENTS

| 2,156,252 | 4/1939 | Cichero | 244—118 |
| 2,699,305 | 1/1955 | Turner et al. | 244—141 |

FOREIGN PATENTS

| 1,275,699 | 10/1961 | France. |
| 338,963 | 3/1936 | Italy. |

MILTON BUCHLER, *Primary Examiner.*

ALFRED E. CORRIGAN, *Examiner.*